Figure 1:
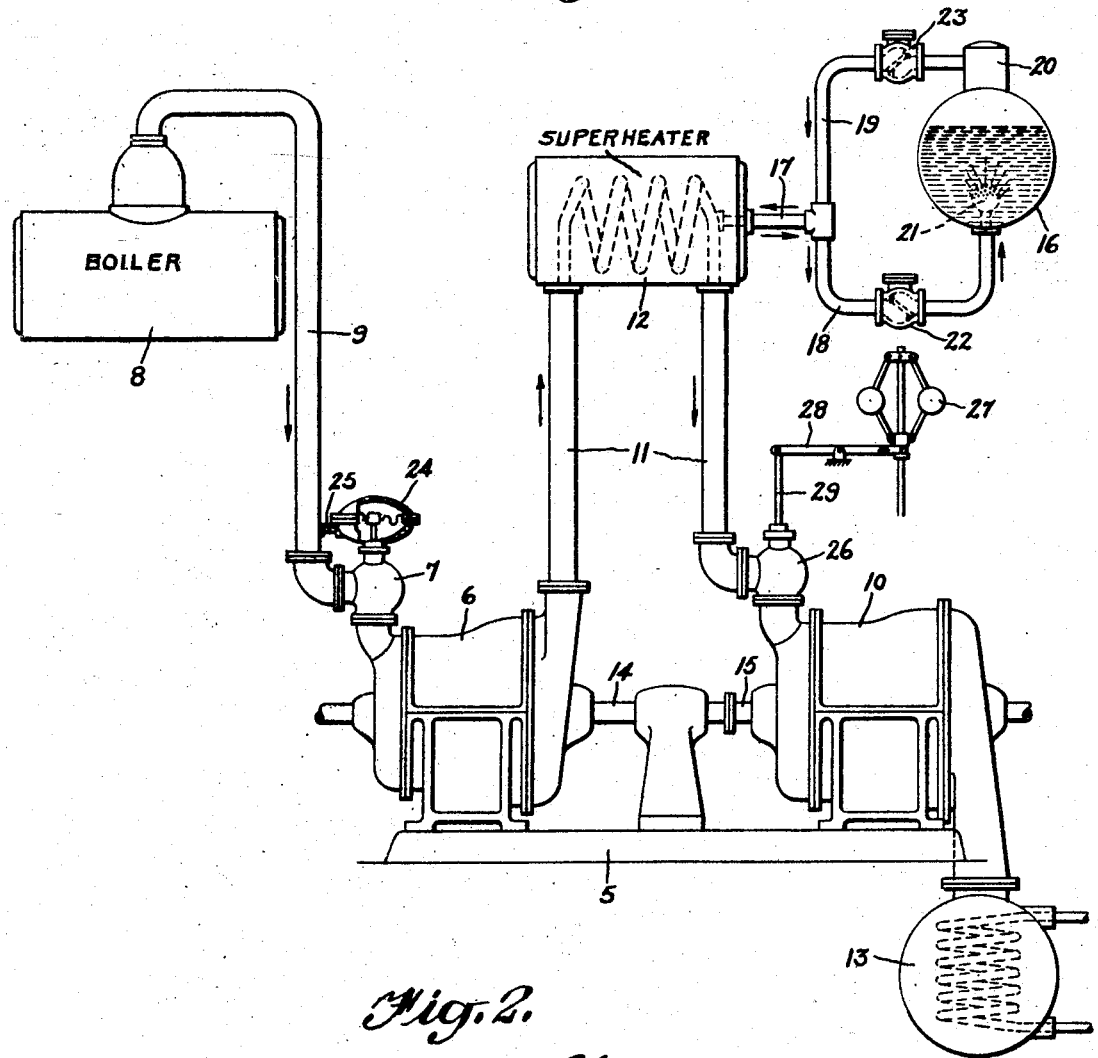

Sept. 2, 1930.   N. HILGERS ET AL   1,774,974
POWER PLANT
Filed July 9, 1926

Inventors:
Nino Hilgers,
Theodor Stein;
by
Their Attorney.

Patented Sept. 2, 1930

1,774,974

UNITED STATES PATENT OFFICE

NINO HILGERS, OF CHARLOTTENBURG, AND THEODOR STEIN, OF FRIEDENAU, BERLIN, GERMANY, ASSIGNORS TO GENERAL ELECTRIC COMPANY, A CORPORATION OF NEW YORK

POWER PLANT

Application filed July 9, 1926, Serial No. 121,463, and in Germany August 7, 1925.

The present invention relates to power plants, and more particularly to power plants employing elastic fluid prime movers arranged for compound operation, with super-heating between the compounded prime mover units.

In power plants of this character wherein a higher pressure prime mover is arranged to supply exhaust elastic fluid to a lower pressure prime mover, the latter unit is subjected to fluctuations in motive fluid supply as furnished by the higher pressure unit, and intermediate superheaters interposed between such units are also subjected to corresponding fluctuations in the elastic fluid flowing through them.

In the event that relatively heavy load or full load is removed from such a prime mover arrangement or that the load fluctuates widely, there is danger of overheating in the superheaters because of the resulting reduction or wide and rapid change in elastic fluid flow therethrough, and furthermore the low pressure unit may be unfavorably affected because of the resulting abnormally high temperature of the elastic fluid supplied to it by the superheaters under the above conditions of operation.

Thus it will be seen that fluctuations in load necessitate close and constant regulation of the heating supply to the superheaters to prevent burnouts. In the event that, according to usual practice, the intermediate superheaters are placed in the furnaces with the elastic fluid generators or boilers supplying the prime movers, such rapid changes in elastic fluid flow in the superheaters cannot be accompanied by corresponding changes in the heating supply for the superheaters because the combustion conditions in the furnaces cannot be changed rapidly, and even with separately heated superheaters such changes in load require constant attention in regard to heat regulation of the boiler furnaces and of the superheaters.

Without separate heating of the superheaters and close attention, it will be seen that rapid and wide fluctuations in load impose abnormal and dangerous operating conditions on both the superheaters and the low pressure units supplied through said superheaters, making it extremely difficult to obtain full benefits from the compound operation of prime movers with inter-unit or intermediate superheating.

In view of the above-named and other operating difficulties common to power plants of the type referred to, it is the object of this invention to provide an improved power plant arrangement which embodies compounded elastic fluid prime movers or prime mover units with intermediate superheaters, whereby the advantages and benefits of intermediate superheating may be realized without endangering the apparatus involved, through abnormal operation, and which permits of more economical and efficient operation of such a power plant arrangement than has heretofore been possible.

For a further consideration of what is believed to be novel and the invention, attention is now directed to the accompanying drawing, the description thereof and the appended claims.

Figure 2:
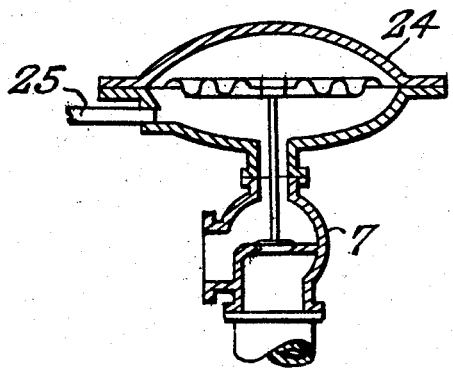

In the drawing, Fig. 1 is a diagrammatical representation of a simple elastic fluid prime mover installation or power plant embodying the invention, and Fig. 2 is a detailed sectional view of a pressure control valve means.

Referring to the drawing, 5 is an elastic fluid prime mover comprising a high pressure section 6, provided with a throttle valve 7, and supplied with motive fluid from an elastic fluid generator 8 through a high pressure supply conduit 9, and a low pressure section 10 which receives exhaust elastic fluid from the high pressure section through an intermediate or low pressure supply conduit 11.

In conduit 11 is located suitable means for superheating the exhaust elastic fluid from the high pressure section. This is indicated in the present example by an intermediate superheater 12. The low pressure section 10 is arranged to exhaust into the usual surface condenser, indicated at 13.

The simple power plant provided by the above described prime mover arrangement represents a more common and well known compound prime mover arrangement having intermediate superheating. By way of example, the prime mover is represented by an elastic fluid turbine having the high and low pressure sections in separate casings, with their shafts, indicated at 14 and 15 respectively, joined for operation as a single unit, although each of said shafts may, if desired, operate separately.

For purposes of illustration and for an easier understanding of the embodiment shown in the present example, the power plant may be considered to operate with steam as the elastic motive fluid, in which case the elastic fluid generator 8 may be considered to represent a boiler or boiler battery supplying the high pressure section 6 of the turbine.

Between the intermediate superheater and the low pressure section of the turbine, a suitable low pressure steam accumulator, indicated at 16, is connected with conduit 11 through a conduit 17 having an inlet branch 18 and an outlet branch 19. The arrangement in the present example is such that the accumulator is connected with conduit 11 at the delivery end of the superheating means although it may be connected at any other point in conduit 11 between the delivery end of the superheater and the low pressure section of the prime mover.

The steam accumulator of the present example is provided with a steam chest 20 with which the outlet branch conduit 19 is connected and with a perforated steam inlet head 21 with which the inlet branch conduit 18 is connected. Branch conduits 18 and 19 are each provided with a non-return valve as indicated at 22 and 23 respectively. Valve 23 operates to prevent inflow to the accumulator while permitting outflow therefrom, and valve 22 operates to prevent outflow from the accumulator while permitting inflow thereto.

Throttle valve 7 of the high pressure unit is connected with and is controlled by a suitable pressure regulator 24, which, through connection with the high pressure supply conduit 9, as indicated at 25, operates to open valve 7 in response to increased pressure in said supply conduit.

This pressure regulator arrangement is such that it tends to maintain a constant pressure in conduit 9, that is, a constant boiler pressure. Viewed in another way, it operates to supply steam to the turbine in accordance with the quantity of steam being generated by the boiler, since increased generation tends to produce increased pressure, and thereby regulates at constant boiler pressure.

The low pressure unit is also provided with a throttle valve 26 which is controlled by suitable governor means, such as a speed governor 27, which is preferably made responsive to the speed of the low pressure section of the turbine. In the present example this speed is the same as that of the high pressure section. The governor is indicated as operating the pilot valve directly through a pivoted lever 28 and a sliding valve stem 29 only by way of example. Any suitable governing means may be provided in connection with the low pressure section, which together with the throttle valve or other suitable means for controlling the elastic fluid input to the low pressure section, provides means for controlling said elastic fluid input in response to fluctuations in load on the prime mover. The speed governor and throttle valve provides the simplest and most easily understood example of such means.

The high pressure section of the turbine takes steam from the boiler at substantially constant pressure as hereinbefore stated and is operated at substantially constant load by firing the boiler at a constant rate sufficient to supply the demands made by normal load on the prime mover or turbine. The pressure regulator controls the high pressure section and permits it to take the output of the boiler at substantially constant pressure.

As the boiler then operates with no capacity for accumulation, the quantity of steam flowing through the high pressure section at all times corresponds to the firing condition of the boiler. This permits, with proper relation of the boiler capacity and rating of the high pressure section to the load, to operate the boiler and high pressure section at a constant, high efficiency with substantially constant load over longer periods of time than has heretofore been possible.

The intermediate superheating means 12 may also be operated at a substantially constant rate since the steam exhausting from the high pressure section passes through it at a substantially constant rate. This renders it practically free from danger of burnout and permits a constant temperature and superheat to be maintained.

Between the superheater and the low pressure section, the accumulator operates to store or give up low pressure steam in accordance with the demand of the low pressure section of the turbine, which takes the normal load fluctuations under control of the speed governor. An increase in load causes a slight decrease in speed and a corresponding increase in the opening of throttle valve 26 by the speed governor whereby the low pressure section takes additional steam from low pressure conduit 11. Likewise, an increase in speed, accompanying a reduction in load, results in the low pressure section taking less steam from conduit 11.

When the low pressure section takes less low pressure steam than is constantly supplied by the high pressure section, pressure builds up in conduit 11. This pressure is relieved through conduit 17 and branch 18 by operation of non-return valve 22. The excess steam passes into the accumulator through head 21 and is stored until load conditions cause the low pressure section to take more steam than is supplied by high pressure section, at which time the pressure in conduit 11 tends to fall because of the demand, and the accumulator then discharges some of its stored steam into the region of lower pressure repesented by conduit 11 though outlet branch 19, conduit 17, and non-return valve 23.

Thus a power plant arranged as shown in the present example provides for constant load operation of the elastic fluid generator or boiler and the intermediate superheating means, resulting in high operating efficiency without involving disadvantages heretofore met in plants of this character, while the low pressure section of the prime mover takes the load fluctuations independently of the elastic fluid generator, superheating means and high pressure section, through connection with an accumulator or elastic fluid storage means and separate governor.

With the above described arrangement, load variations which occur over longer periods of time, as in the transition from peak load to stand-by load, are easily met by adjusting the firing of the elastic fluid generator or boiler over such longer periods of time, together with the heating of the superheating means. Such changes are slow and are entirely within the capabilities of the usual elastic fluid generator and superheating means to follow without danger of overheating or burnout in any of the apparatus involved.

While the invention has been described in connection with a simple diagrammatical representation of what is at present considered to be a preferred embodiment, it should be understood that it is not limited thereto and may be carried out by other means.

What we claim as new and desire to secure by Letters Patent of the United States, is:

1. In a power plant, the combination with an elastic fluid prime mover having high and low pressure sections connected by a conduit, an intermediate superheater in said conduit, and means providing a substantially constant supply of elastic fluid to the high pressure section, of a governor means for the low pressure section which controls the admission of elastic fluid thereto from said conduit in response to changes in load on the prime mover, an elastic fluid accumulator, and a conduit means connecting the accumulator with said conduit between the superheater and the low pressure section and through which elastic fluid may flow from the conduit to the accumulator or from the accumulator to the conduit whereby by the storage of elastic fluid in the accumulator and the flow of elastic fluid from the accumulator to the low pressure section substantially constant elastic fluid flow is maintained through the superheater and the high pressure section.

2. In a power plant, the combination with an elastic fluid prime mover having high and low pressure sections connected by a conduit and an intermediate superheater in said conduit, of means connected with the high pressure section for supplying elastic fluid thereto at substantially a constant pressure, governor means for the low pressure section for admitting elastic fluid thereto from the high pressure section through said conduit in response to changes in load on the turbine, an elastic fluid accumulator, and a conduit means connecting the accumulator with the conduit between the superheater and the low pressure section of the prime mover and through which elastic fluid may flow from the conduit to the accumulator or from the accumulator to the conduit whereby there is maintained substantially a constant elastic fluid flow through the superheater independently of the load in the prime mover.

3. In a power plant, the combination with an elastic fluid generator, an elastic fluid prime mover having a high pressure section connected with the generator and a low pressure section connected with the high pressure section through a conduit and a superheater, of means for regulating the flow of elastic fluid through the prime mover to provide substantially a constant load on the generator and substantially constant flow through the superheater whereby the latter is protected from burnouts and overheating and the low pressure section from excessively high temperature elastic fluid, said means comprising an admission valve for the high pressure section, a pressure regulator responsive to generator pressure connected with said valve to control the same, an admission valve for the low pressure section, an operating governor responsive to the speed of the low pressure section connected with the last-named admission valve to control the same, an elastic fluid accumulator and a conduit means connecting the accumulator to said conduit between the superheater and the low pressure section and through which elastic fluid may flow from the conduit to the accumulator or from the accumulator to the conduit, whereby said accumulator is connected with the superheater to receive and store excess elastic fluid therefrom under certain load conditions and with the low pressure section to supply thereto such stored elastic fluid under certain other load conditions.

In witness whereof, we have hereunto set our hands this 23rd day of June, 1926.

NINO HILGERS.
THEODOR STEIN.